United States Patent Office 3,330,793
Patented July 11, 1967

3,330,793
WAX, ETHYLENE/VINYL ACETATE MOLDING
COMPOSITION
John Podlipnik, Palos Heights, and David L. Skilton,
Park Forest, Ill., assignors to Sinclair Research, Inc.,
New York, N.Y., a corporation of Delaware
No Drawing. Filed Mar. 17, 1964, Ser. No. 352,676
2 Claims. (Cl. 260—28.5)

This invention relates to a wax composition for use in molding toys, novelties and other articles and characterized by good mold reproducibility and superior physical strength, and particularly characterized by the property of moldability at relatively low molding temperatures.

At the present time the molding industry uses low-molecular weight polyethylenes (2000–4000 mol. wt.) for molding novelties and other objects by slush and rotational molding procedures. In one particular instance the polyethylene is used in a machine which molds novelty or souvenir articles by injecting a quantity of molten material between a set of cooled dies, removing surplus material inside the molded article and vending the cooled object to a customer.

Certain desired features of the molded articles are not readily available with this presently used polyethylene. Among these are low molding temperatures which produce relatively cool vended articles, and insufficient flexural strength to allow for durability of the objects. It is highly desirable to bend these articles cool for in order to keep production at a maximum level, the production cycle must be of minimum duration. In the past there have been instances of burns suffered by individuals handling the hot molded articles made from polyethylene. Thus the use of polyethylene with its relatively high melting point has caused concern over this danger. Then too, the flexural strength of the presently used polyethylene is quite low. This problem is characterized by very poor product durability.

A molding composition has now been discovered which possesses properties highly desired by molding machine manufacturers and operators. The composition of the invention, for instance, provides molded articles of better flexibility and durability than those obtained from low molecular weight polyethylenes. Since the melting point of the composition of the invention is lower than that of the low molecular weight polyethylenes used, it can be molded at lower temperatures. A cooler molded article is vended as a consequence and the hazards of burns from completed articles and the melt drippings are minimized. Also the composition of the invention has proper flow or viscosity and lends itself to good mold reproducibility. Furthermore, it has an added advantage in being adaptable to several different types of molding processes, such as slush molding, rotational molding, etc.

The composition of the present invention consists essentially of a petroleum wax blend of two different crystalline paraffin waxes (hereinafter referred to as paraffin wax A and paraffin wax B) and a microcrystalline wax, said blend having incorporated therein a given amount of an ethylene-vinyl acetate copolymer. Each of the components is present in the wax composition of the invention in given amounts to be discussed below. All of the components are required to provide a satisfactory composition and the absence of but one of the components results in a composition which with respect to molding, suffers from one or more of the following characteristics: poor flow (viscosity), high melting point, poor mold reproducibility, and produces molded articles of unsatisfactory strength, durability, rigidity or flexibility, etc.

Paraffin wax A of the wax blend is characterized by having, typically, a melting point of about 140 to 145° F. (ASTM D-87), a refractive index at 80° C. of about 1.4285 to 1.4320, a viscosity of about 39 to 43 SUS at 210° F. (ASTM D-88), and a needle penetration at 100° F. of about 10 to 20 (ASTM D-1321). This paraffin wax component can be obtained by conventional processing of a waxy, medium petroleum distillate, for instance, a waxy lubricating oil distillate boiling primarily in the range of about 780 to 880° F. Paraffin wax A constitutes about 20 to 40% by weight of the base wax blend of the invention.

Paraffin wax B of the invention is characterized by having a melting point of about 150 to 160° F. (ASTM D-87), a viscosity of about 45 to 50 SUS at 210° F. (ASTM D-88) and a needle penetration at 100° F. of about 20 to 40 (ASTM D-1321). This relatively high melting point paraffin wax can be obtained by conventional processing of waxy heavy petroleum distillates as, for instance, waxy heavy lubricating oil distillates boiling primarily in the range of about 850 to 1050° F. Paraffin wax B constitutes about 30 to 70% of the base wax blend.

The microcrystalline wax component of the invention is characterized by having, typically, a melting point of about 160 to 180° F. (ASTM D-127), a refractive index at 80° C. of at least about 1.445, a viscosity of about 75 to 100 SUS at 210° F. (ASTM D-88) and a needle penetration at 100° F. of about 20 to 50 (ASTM D-1321). The microcrystalline wax component can be obtained by conventional methods from waxy petroleum distillation residues, such residues being largely non-boiling at 1050° F., or by blending separately prepared microcrystalline waxes such that the desired properties are obtained. The microcrystalline wax component constitutes about 10 to 30% by weight of the base wax blend.

The general type of ethylene-vinyl acetate copolymer employed is described in U.S. Patent No. 2,877,196 to Reding. However, the vinyl acetate content (by weight in the copolymer) of the ethylene-vinyl acetate copolymer of the present invention should be about 20 to 30% and the molecular weight of the copolymer as indicated by "melt index" should be about 15–40. Higher and lower molecular weight ethylene-vinyl acetate copolymers can be blended together to obtain a copolymer having a melt index within this range.

The concentration of the ethylene-vinyl acetate is about 25 to 35%, preferably about 30%, by weight of the total composition. Adding less than about 25% of the copolymer results in a final composition that is too waxy in nature and lacking in sufficient toughness. On the other hand, a composition containing more than about 35% by weight of the copolymer creates viscosity difficulties.

The complete molding composition can be simply prepared by melting the wax components together and blending in the ethylene-vinyl acetate copolymer. The copolymer can be dispersed completely by use of a slow speed blade agitator provided the bottom and sides of the vessel are subjected to the positive action of the blades.

If desired, other additives such as antioxidants and the like can be included in the composition to impart special characteristics so long as the desired features of the composition are not deleteriously affected.

The following examples are included to further illustrate the present invention.

Example

A paraffin wax A was obtained as follows:

A waxy petroleum distillate having a 10–90% distillation range of 780–880° F. at 760 mm. pressure and obtained from the vacuum distillation of a Mid-Continent crude was dearomatized by conventional phenol treatment and solvent dewaxed by conventional low temperature precipitation from methyl ethyl ketone-toluene solution to produce a +10° F. pour point oil. The resultant slack wax was subjected to two successive deoiling steps using conventional methyl ethyl ketone-toluene deoiling at 50° F. temperature to produce a hard, highly n-paraffinic wax. The paraffinic wax designated A had the following physical properties: a melting point of 143° F.; a refractive index at 80° C. of 1.4310; a viscosity at 210° F. of 40.7 SUS; and a needle penetration at 100° F. of 15.

A paraffinic wax designated B, was prepared as follows:

composition of the invention and is designated Blend M in the table.

For comparison, a commercial polyethylene Blend E (25% 12,000 mol. wt. polyethylene and 75% 2,000 mol. wt. polyethylene), and Blends F, G, H, I, J, K and L identified in the table below were similarly tested. These results are also summarized in the table.

TABLE

| Blend | | Type of Mold | Avg. Weights in grams | Mold Temp. Range,[1] °F | Mold Reproduction | Cold Strength | Liquid Flow[2] | Remarks |
|---|---|---|---|---|---|---|---|---|
| E | Polyethylene | Gorilla | 22 | 250 | Very good | Poor | 15 | Exhibits stress cracking. |
|   |   | Dinosaur | 60 | 250+ | ----do---- | ----do---- |   |   |
| F | 30% Elvax 260[3] | Gorilla | 27.6 | 185-195 | Fair | Excellent | 115 | High viscosity leading to high consumption. |
|   | 70% Paraffin wax B | Dinosaur | [4] |   |   |   |   |   |
| G | 27% Elvax 240 | Gorilla | 24.8 | 175-225 | Good | Good | 14 |   |
|   | 73% Paraffin wax B | Dinosaur | 63.3 | 175-200 | ----do---- | ----do---- |   |   |
| H | 28½% Elvax 240 | Gorilla | 30.3 | 185-215 | Very good | Good | 55 | Initially good—brittle on aging. |
|   | 66½% Paraffin wax B | Dinosaur | [4] |   |   |   |   |   |
|   | 5% talc |   |   |   |   |   |   |   |
| I | 28½% Elvax 240 | Gorilla | 28.2 | 190-215 | Very good | Good | 75 | Relatively high viscosity leading to higher consumption. |
|   | 66½% Paraffin wax B | Dinosaur | [4] |   |   |   |   |   |
|   | 5% Butyl rubber |   |   |   |   |   |   |   |
| J | 25% Elvax 260[3] | Gorilla | 32.8 | 190-200 | Fair to good | Fair | 68 | Exhibits stress cracking. |
|   | 75% Microwax C | Dinosaur | [4] |   |   |   |   |   |
| K | 30% Elvax 240 | Gorilla | 23.1 | 199-233 | Good | Very good | 20 | Good material, but reproduction inadequate for some molds. |
|   | 70% Paraffin wax B | Dinosaur | 62.5 | 190-220 | ----do---- | ----do---- |   |   |
| L | 30% Elvax 260 | Gorilla | 23 | 195-210 | Poor | Good |   |   |
|   | 70% Paraffin wax A | Dinosaur | [4] |   |   |   |   |   |
| M | Composition of invention | Gorilla | 23.5 |   | Very good | Very good | 16 |   |
|   |   | Dinosaur | 65.0 | 190-220 | ----do---- | ----do---- |   |   |

[1] Pot temperature only.
[2] Time required for 90 cc. of molten material to pass through orifice at 215° F. (except Blend E at 250° F.) shown in seconds.
[3] Ethylene—28% vinyl acetate copolymer having a 1.5 melt index.
[4] Not run. Dinosaur mold not available at time of runs.

A waxy, heavy lube distillate having a 10–90% distillation range of 850 to 1050° F. at 760 mm. pressure was subjected to the techniques described above in the preparation of paraffin wax A and a hard, oil-free wax was obtained having the following physical properties: a melting point of 153° F.; a viscosity at 210° F. of 47.4 SUS; and a needle penetration at 100° F. of 25.

A microcrystalline wax was prepared as follows:

A mixed base crude oil was vacuum distilled and the portions boiling below 1050° F. were removed. The residual stock was deasphalted by conventional propane extraction and the deasphalted oil dearomatized by phenol treating and dewaxed at −8° F. by conventional solvent dewaxing employing a 50–50 mixture of methyl ethyl ketone-toluene at 50° F. temperature to produce a microcrystalline wax C having a melting point of 171° F.; a refractive index at 80° C. of 1.4482; a viscosity of 81.4 SUS at 210° F. and a needle penetration at 100° F. of 30.

Paraffin wax A, paraffin wax B, the microcrystalline wax and an ethylene-vinyl acetate copolymer (containing 28% vinyl acetate) and having a melt index of 25 (Elvax 240) were blended together along with 200 p.p.m. butylated hydroxy toluene (an antioxidant), to provide the following composition:

Paraffin wax A (143° F. M.P.), 36%
Paraffin wax B (153° F. M.P.), 42% } percent__ 70
Microcrystalline wax C (171° F. M.P.), 22%
Ethylene-vinyl acetate copolymer (Elvax 240) _do__ 30
Butylated hydroxy toluene (BHT) _____p.p.m.____ 200

The wax composition was evaluated using a commercial molding machine to make gorilla and dinosaur type toys, several inches in height. About 40 pounds of the wax composition was run through the machine which was adjusted to operate continuously. The flow or viscosity was determined prior to the run. As the articles were molded and dispensed their physical characteristics were observed. The physical strength of the articles was determined by attempting to crush the cooled article underfoot and by squeezing in the hand. Flexibility was determined in like manner. Direct comparison to mold surfaces served to determine mold reproduction. The results of the tests are shown in the table below. This blend represents the The results of the testing show that the composition of the present invention provides the best all around performance of all the blends evaluated. The results also show that a blend of waxes is necessary along with the defined ethylene-vinyl acetate copolymer of the invention in order to obtain the desired properties. A more detailed description of the results is as follows:

(1) Blend E, the polyethylene blend had poor flexibility and exhibited stress cracks in the molded article as well as requiring relatively high mold temperatures.

(2) Blend F was too viscous to give completely acceptable performance and led to high consumption and only fair mold reproduction.

(3) Blend G performed well with respect to viscosity requirements but left some room for improvement in strength and durability.

(4) Blend H represented an attempt to enhance mold reproduction by the inclusion of filler material. Some improvement was noted but the talc additive adversely affected flexibility on aging.

(5) Blend I was also an attempt to improve mold reproduction by the addition of butyl rubber. However, the rubber caused sticking to molds and an increase in viscosity, and adversely affected wax consumption.

(6) Blend J shows that use of microcrystalline wax instead of the more crystalline paraffin wax B improves mold reproduction but the molded articles exhibited stress cracks.

(7) Blend K showed poor mold reproduction and products similar in brittleness to those molded with Blend J.

(8) Blend L showed poor mold reproduction.

It is claimed:

1. A molding composition consisting essentially of a major amount of a wax blend consisting essentially of
   (A) About 20 to 40% of a paraffin wax having a melting point of about 140 to 145° F. (ASTM D–87), a refractive index at 80° C. of about 1.4285–1.4320, a needle penetration at 100° F. (ASTM D–1321) of about 10 to 20 and a viscosity of about 39 to 42 SUS at 210° F. (ASTM D–88),
   (B) About 30 to 70% of a paraffin wax having a melting point of about 150 to 160° F. (ASTM D–87), a viscosity of about 45 to 50 SUS at 210° F. (ASTM D–88) and a needle penetration at 100° F. of about 20 to 40 (ASTM D–1321) and (C) About 10 to 30% of a microcrystalline wax having a melting point of about 160 to 180° F. (ASTM D–127), a refractive index at 80° C. of about 1.445 minimum, a viscosity of about 75 to 100 SUS at 210° F. (ASTM D–88) and a needle penetration at 100° F. about 20 to 50 (ASTM D–1321)

having incorporated therein about 25 to 35% by weight of the total composition of a copolymer of vinyl acetate and ethylene, said copolymer having a vinyl acetate content of about 20 to 30% and a melt index of about 15 to 40.

2. The composition of claim 1 wherein the vinyl acetate copolymer has a melt index of 25.

References Cited

UNITED STATES PATENTS

| | | | |
|---|---|---|---|
| 3,025,167 | 3/1962 | Butler | 260—28.5 |
| 3,178,383 | 4/1965 | Stout | 260—28.5 |
| 3,181,765 | 5/1965 | Bonzagni | 260—28.5 |
| 3,205,186 | 9/1965 | Zaayenga | 260—28.5 |

MORRIS LIEBMAN, *Primary Examiner.*

J. FROME, *Assistant Examiner.*